United States Patent [19]

Kühlmann

[11] Patent Number: 4,846,337

[45] Date of Patent: Jul. 11, 1989

[54] ARRANGEMENT FOR MANIPULATING EGGS

[76] Inventor: Josef Kühlmann, Königstrasse 51, D-4401 Laer, Fed. Rep. of Germany

[21] Appl. No.: 24,338

[22] Filed: Mar. 5, 1987

[30] Foreign Application Priority Data

Jul. 17, 1985 [DE] Fed. Rep. of Germany ....... 3525460
Nov. 28, 1986 [DE] Fed. Rep. of Germany ....... 3640816

[51] Int. Cl.$^4$ ............................................ B65G 13/02
[52] U.S. Cl. .................. 198/475.1; 198/801; 119/48
[58] Field of Search ............... 198/475.1, 477.1, 485.1, 198/487.1, 607, 706, 710, 712, 801, 802, 803.14, 803.15, 797, 841; 119/48, 22, 17, 45 R

[56] References Cited

U.S. PATENT DOCUMENTS

| 660,998 | 10/1900 | Raymond | 198/797 X |
|---|---|---|---|
| 2,710,682 | 6/1955 | Coll | 119/48 |
| 2,870,900 | 1/1959 | Will | 198/801 X |
| 2,987,038 | 6/1961 | Cole | 119/48 |
| 3,111,215 | 11/1963 | Tellefson | 198/803.14 |
| 3,486,605 | 12/1969 | Gough | 198/706 |
| 3,499,519 | 3/1970 | Belk et al. | 198/801 X |
| 3,770,107 | 11/1973 | Michelbach | 198/802 X |
| 3,789,802 | 2/1974 | Conley | 119/48 |
| 4,072,227 | 2/1978 | Nomura et al. | 198/487.1 X |
| 4,168,009 | 9/1979 | Ide | 198/475.1 X |
| 4,488,639 | 12/1984 | Vogt et al. | 198/781 X |
| 4,556,143 | 12/1985 | Johnson | 198/841 |

FOREIGN PATENT DOCUMENTS

| 2148778 | 4/1973 | Fed. Rep. of Germany | 198/797 |
|---|---|---|---|
| 2263355 | 7/1973 | Fed. Rep. of Germany | 198/801 |
| 2235767 | 2/1974 | Fed. Rep. of Germany | 198/803.14 |
| 3138748 | 4/1983 | Fed. Rep. of Germany . | |
| 1154746 | 4/1958 | France . | |
| 1462915 | 12/1966 | France . | |
| 2274214 | 1/1976 | France . | |
| 8002232 | 11/1981 | Netherlands . | |
| 1427 | of 1910 | United Kingdom . | |
| 2101951 | 1/1983 | United Kingdom . | |

Primary Examiner—Robert J. Spar
Assistant Examiner—Cheryl L. Gastineau
Attorney, Agent, or Firm—Peter K. Kontler

[57] ABSTRACT

An arrangement for removing eggs from laying houses disposed at different levels includes a plurality of branch conveyors each of which is arranged at a respective level and extends by the corresponding laying houses. The branch conveyors function to collect the eggs from the laying houses and to convey the eggs to a main conveyor which transports the eggs to a common discharging location. The main conveyor comprises an endless chain driven in an endless path, and a plurality of egg carriers mounted on the chain. Each egg carrier includes a supporting arm which is pivotally connected to the chain at one end and carries a frame-like element at its other end. The chain has a vertical run which extends by the branch conveyors so as to permit the transfer of eggs from the branch conveyors to the main conveyor. The supporting arms are perpendicular to the planes of the respective frame-like elements and normally extend vertically so that the frame-like elements normally have a horizontal orientation. The eggs from the branch conveyors are deposited on the frame-like elements which serve as cradles for the eggs. In order to discharge the eggs from the frame-like elements, the supporting arms are caused to contact a slide plate which effects pivoting of the supporting arms and frame-like elements through an angle of approximately 90°. This allows the eggs to roll out of the frame-like elements.

26 Claims, 4 Drawing Sheets

ARRANGEMENT FOR MANIPULATING EGGS

This application is a continuation-in-part of International Application No. PCT/DE86/00262 filed 24 June 1986, and now abandoned.

BACKGROUND OF THE INVENTION

The invention relates generally to an arrangement for manipulating eggs.

More particularly, the invention relates to an arrangement for removing eggs from laying houses disposed at different levels.

Egg farms generally have a battery of laying houses which are disposed at different levels one above the other. A so-called egg collecting band is provided at each level in order to convey the eggs discharged from the individual laying houses to a central collecting point. These egg collecting bands are likewise located one above the other.

In one prior art arrangement, the eggs are removed from the egg collecting bands by hook-like or fork-like elements and then transported to a central collecting belt. These hook-like or fork-like elements have the drawback that the eggs are readily damaged so that the proportion of cracked eggs is relatively large.

The West German Gebrauchsmuster No. 72 27 032 discloses an arrangement in which a plurality of cups are mounted on an endless driven sprocket chain. Here, the eggs discharged from the egg collecting bands are introduced into the cups by means of lifting tables. This arrangement thus eliminates the damage caused by the hook-like or fork-like elements. However, as the sprocket chain undergoes changes in direction, the eggs move from one wall of the cups to the other. Moreover, the eggs must again be transferred from the cups to a baffle or a collecting plate. Thus, the eggs are turned and manipulated several times even before they arrive at the final collecting belt from which the eggs are removed for further processing. Accordingly, substantial damage to the eggs is to be expected here also.

OBJECTS AND SUMMARY OF THE INVENTION

It is an object of the invention to provide an arrangement which enables eggs to be manipulated relatively gently.

Another object of the invention is to provide an arrangement which makes it possible to manipulate eggs with relatively little danger of damage to the eggs.

An additional object of the invention is to provide an arrangement which allows eggs to be readily transferred from one or more branch collecting units to a main collecting unit.

A further object of the invention is to provide a method which enables eggs to be manipulated relatively gently and with relatively little danger of damage to the eggs.

It is also an object of the invention to provide an arrangement in which one or more branch collecting units deliver eggs to a main collecting unit and the eggs can pass through and be conveyed away from such units for further processing with relatively little back-and-forth movement of the eggs.

Yet another object of the invention is to provide an egg collecting unit which may be employed in the removal of eggs from laying houses as well as in egg washing and egg sorting apparatus.

The preceding objects, as well as others which will become apparent as the description proceeds, are achieved by the invention.

One aspect of the invention resides in an arrangement for removing eggs from laying houses disposed at different levels. The arrangement comprises a first or branch conveyor, e.g., a band conveyor, at each level, and the branch conveyors extend by the respective laying houses so as to collect eggs from the same. Each of the branch conveyors has a discharge end. The arrangement further comprises a second or main conveyor, e.g., a chain conveyor, for transporting eggs away from the respective levels. The main conveyor has an egg receiving section which extends by the discharge ends of the branch conveyors. The main conveyor includes an endless driven member, e.g., a chain, defining an endless path, and a plurality of egg carriers mounted on the driven member or chain for movement along such path and each including a frame-like element. The main conveyor is designed so that the frame-like elements are substantially horizontal in the receiving section of the main conveyor.

The second or main conveyor may be considered to constitute an egg elevator, and the terms "second conveyor", "main conveyor" and "egg elevator" are used interchangeably herein.

The frame-like elements of the egg elevator are preferably pivotally mounted on the driven member or chain of the elevator.

According to one embodiment of the invention, each of the egg carriers of the egg elevator further includes a supporting arm or lever which is connected with the driven member or chain of the elevator and carries the respective frame-like element. It is preferred for the supporting arms to extend perpendicular to the respective frame-like elements. The frame-like elements may be rigid with the respective supporting arms and the latter may, in turn, be pivotally mounted on the driven member or chain of the egg elevator via pivot pins. The supporting arms are advantageously arranged so that they extend upwards from the respective frame-like elements in the egg receiving section of the egg elevator.

The invention thus provides an egg elevator including individual frame-like elements which are carried, preferably pivotally, by a driven member or chain. The frame-like elements are advantageously designed to accommodate one or, at most, two eggs. The eggs may rest on the frame components of the frame-like elements thereby allowing the eggs to be securely held.

Deflecting means for changing the direction of travel of the driven member or chain may be located in the upper portion of the egg elevator and such deflecting means may include a system of rotary elements. The deflecting means may be combined with tilting means which causes the frame-like elements to pivot or tilt so that the eggs can be discharged from the frame-like elements. The rotary deflecting elements may effect a reduction in the speed of advance of the frame-like elements thereby allowing the latter to have a relatively low speed in the egg discharging region. This enables the eggs to be discharged gently and without problems.

In accordance with another embodiment of the invention, a guide is provided for the egg elevator. The guide is formed with at least one groove which receives the driven member or chain of the elevator, and the groove advantageously has a cross-sectional outline similar to that of the driven member or chain. The driven member or chain may have projecting portions and the groove then has recessed portions or cutouts which receive such projecting portions. The guide is preferably formed with one or two such grooves.

A guide including a groove which is provided with cutouts for projecting portions of the driven member or chain of the elevator and which has a cross-sectional outline similar to that of the driven member or chain may constitute a holding device for the driven member or chain. Such a holding device may have a very simple design and further allows the driven member or chain to be laid out in any desired manner, i.e., even with vertical runs. Moreover, the holding device makes it possible to advance the driven member or chain through curves in the horizontal direction.

The guide advantageously comprises a beam of synthetic resin one side of which is provided with the groove for the driven member or chain. By forming the groove with cutouts for projecting portions of the driven member of chain, it becomes possible for the driven member or chain to be securely held by the guide. The synthetic resin beam, which is preferably made from an antifriction synthetic resin, may be bent about its longitudinal axis to a certain degree. The driven member or chain follows the resulting bend thereby allowing the driven member or chain to advance through any desired curve.

As mentioned previously, the frame-like elements of the egg elevator may be rigid with supporting arms or levers which, in turn, are pivotally mounted on the driven member or chain. Furthermore, the supporting arms or levers preferably extend perpendicular to the frame-like elements. The frame-like elements are to have a horizontal orientation, at least in the egg receiving section of the egg elevator and, to this end, the supporting arms or levers may include relatively heavy metal plates which carry the frame-like elements at one end and are pivotally mounted at the other end. The frame-like elements may be made of a light synthetic plastic material or a light metal.

Pivot pins may be fixed to the driven member or chain of the egg elevator, and the ends of the supporting arms or levers remote from the frame-like elements may be provided with sleeves which receive the respective pivot pins. This makes it possible to obtain a pivoting action which results in a horizontal orientation of the frame-like elements. The sleeves may consist at least in part of a corrosion-resistant antifriction material and the pivot pins likewise advantageously consist at least in part of corrosion-resistant material.

The novel features which are considered as characteristic of the invention are set forth in particular in the appended claims. The improved egg manipulating arrangement itself, however, both as to its construction and its mode of operation, will be best understood from a perusal of the following detailed description of certain specific embodiments when read in conjunction with the accompanying drawings.

DESCRIPTION OF THE PREFERRED EMBODIMENTS

Figure 1:
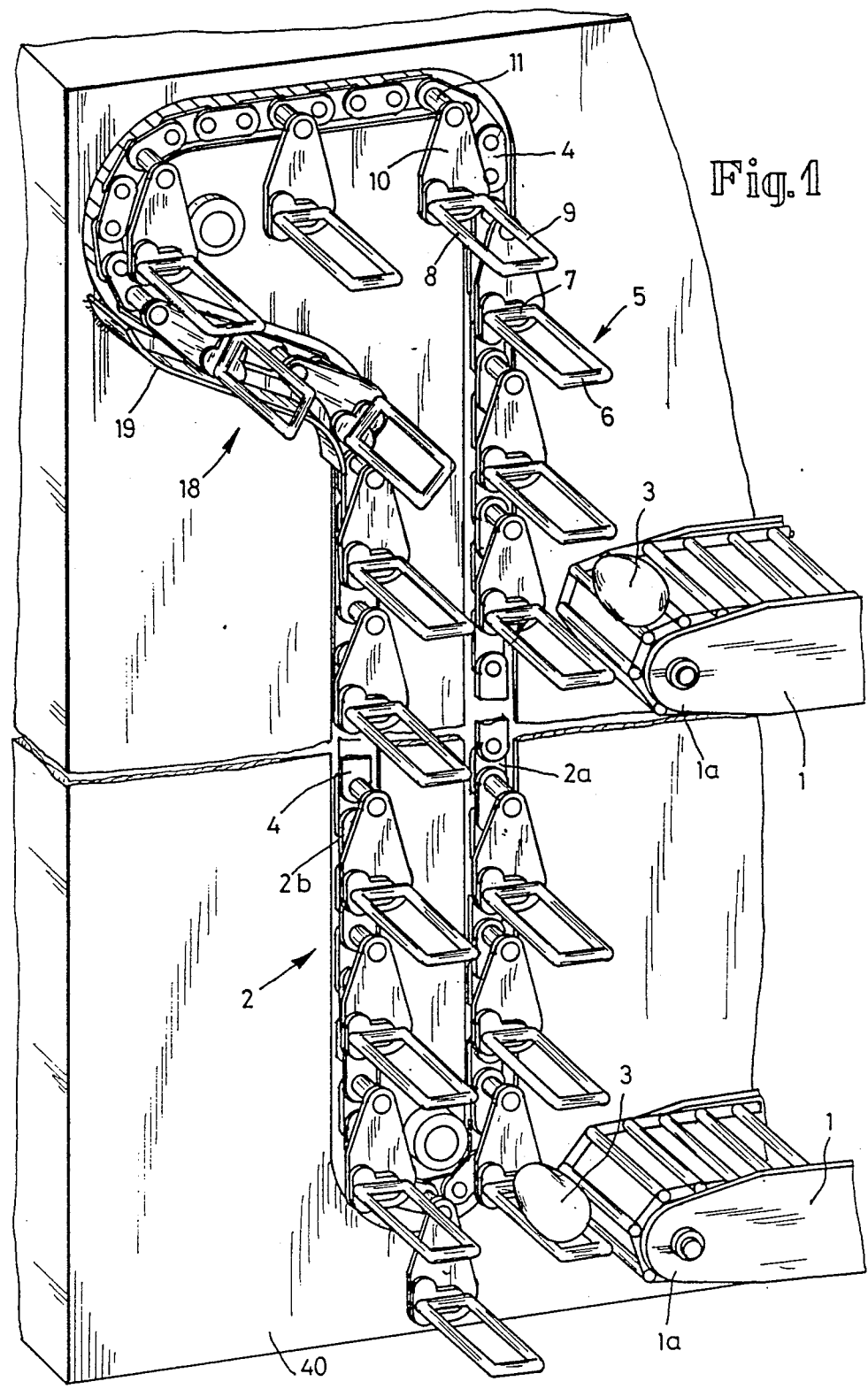
FIG. 1 is a fragmentary perspective view of an egg manipulating arrangement according to the invention.

FIG. 1 illustrates an egg manipulating arrangement according to the invention which may be used on egg farms to remove eggs from a non-illustrated battery of laying houses disposed at different levels one above the other. The eggs discharged from the arrangement may be transported from the latter for further processing, e.g., washing and sorting, by conventional means.

The egg manipulating arrangement includes a plurality of first or branch conveyors 1 which are respectively located at the different levels of the battery of laying houses. The branch conveyors 1 are situated one above the other, and each of the branch conveyors 1 extends by the laying houses located at the respective level. Each of the branch conveyors 1 functions to collect eggs 3 discharged from the associated laying houses and to transport the eggs 3 to a second or main conveyor 2 which is also referred to herein as an egg elevator.

The branch conveyors 1 have discharge ends 1a, and the egg elevator 2 includes a vertical run 2a which is located adjacent to the discharge ends 1a. The vertical run 2a constitutes an egg receiving section of the egg elevator 2, and the eggs 3 arriving at the discharge ends 1a are transferred from the branch conveyors 1 to the egg receiving section 2a of the egg elevator 2. The egg elevator 2 functions to transport the eggs 3 away from the respective levels of the battery of laying houses. The egg elevator 2 has a second run 2b which is spaced from the egg receiving section 2a and also extends in a vertical direction.

The egg elevator 2, which is mounted on a wall 40 or other suitable support structure, includes an endless driven member 4 which defines and is driven in an endless path. The driven member 4 is here in the form of a chain. The egg elevator 2 further includes a plurality of discrete egg carriers which are mounted on the chain 4 for movement along the endless path. Each of the egg carriers comprises a flat frame-like element or frame 5 which, in the illustrated embodiment, is rectangular. The frames 5 are respectively made up of a pair of spaced, parallel, elongated frame components 8 and 9 extending longitudinally of the frames 5 and a pair of spaced, parallel frame components 6 and 7 extending transversely of the frames 5 and connecting the frame components 8,9 to one another. The frame components 6–9 may, for example, being the form of rods or bars. Each of the frames 5 is designed to accommodate one or, at most, two of the eggs 3. In FIG. 1, each of the frames 5 has a length which equals or approximates the width of the branch conveyors 1. As shown in the lower part of FIG. 1, an egg 3 which has been deposited on a frame 5 rests on the frame components 6–9 and is thus securely held against excessive movement. The frames 5 thus serve as cradles for the eggs 3.

Each egg carrier further comprises a supporting arm or lever 10 which is rigidly secured to one of the longitudinal ends of the respective frame 5. In FIG. 1, those ends of the frames 5 constituted by the transverse frame components 7 are fixed to the corresponding supporting arms 10. Each frame 5 is secured to the respective supporting arm 10 in the region of one end of the latter. This end of the supporting arm 10 constitute the lower end thereof in the vertical run 2a of the egg elevator 2. The supporting arms 10 are perpendicular to the planes defined by the respective frames 5 so that such planes are horizontal in the vertical run 2a of the egg elevator 2.

The end of each supporting arm 10 opposite that with the frame 5 is provided with a pivot pin 11. The pivot pins 11 are rotatably connected to the chain 4 so that the supporting arms 10 and frames 5 can pivot relative to the chain 4. The pivot pins 11 are disposed at the upper ends of the supporting arms 10 as these travel through the vertical run 2a of the egg elevator 2.

The frames 5 may consist of a light metal or a light synthetic plastic material. A synthetic plastic material is preferred since this not only has the stability required to support an egg 3 but is also relatively soft so that the possibility of damage to the eggs 3 is reduced. The supporting arms 10, on the other hand, preferably consist of a relatively heavy metallic plate. This helps to establish a vertical orientation of the supporting arms 10 in the vertical run 2a of the egg elevator 2 which, in turn, causes the frames 2 to assume a horizontal position in the vertical run 2a. The frames 5 are then able to receive and hold the eggs 3.

The drive means for the chain 4 is preferably designed to drive the chain 4 in a clockwise direction as seen in FIG. 1. The chain 4 and the frames 5 then move downwards in the run 2a which is located adjacent to the branch conveyors 1 and upwards in the second run 2b. . The drive means for the chain 4 has not been illustrated in FIG. 1.

Figure 2:
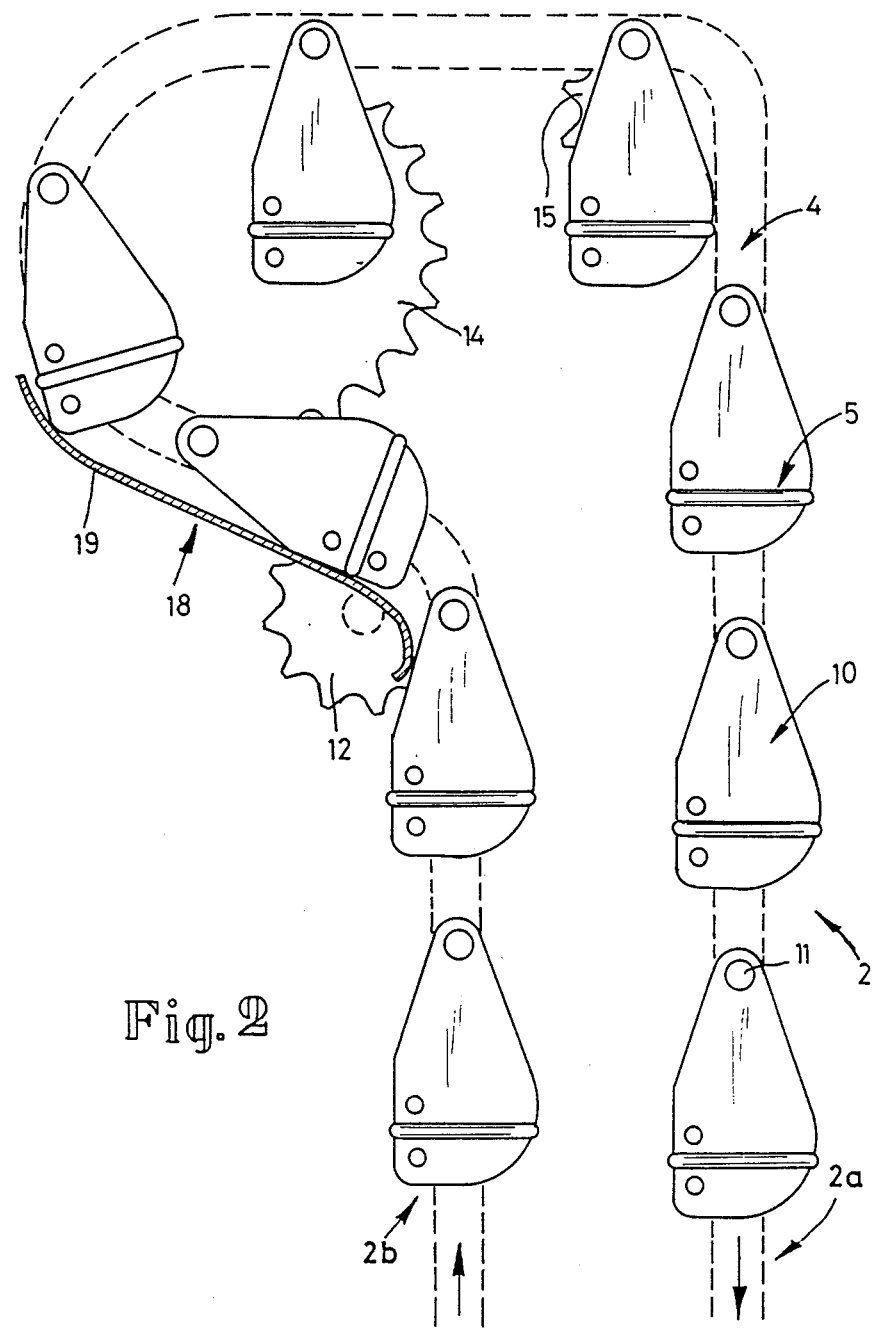
FIG. 2 shows the upper portion of an egg elevator constituting part of the arrangement of FIG. 1.

As best seen in FIG. 2, deflecting means is arranged in the region of the upper end of the egg elevator 2. The deflecting means comprises a system of rotary elements or gears 12, 14 and 15 which function to bend the run 2b of the chain 4 away from, and to then turn the chain 4 towards and into, the run 2a. The gears 12,14 cooperate to bend the chain 4 away from the run 2a while the gears 14,15 cooperate to direct the chain 4 towards the run 2a.

Tilting means 18 is located in the region of the gears 12,14. The tilting means 18 includes an abutment 19 which projects into the path of the supporting arms 10 travelling along the run 2b of the chain 4. The abutment 19 is in the form of a slide plate which is designed in such a manner that the supporting arms 10 are rotated from a vertical to an inclined or horizontal orientation upon contacting the abutment 19. This, in turn, causes the frames 5 to rotate from a horizontal to an inclined or vertical orientation so that the eggs 3 carried by the frames 5 may be discharged from or roll out of the latter. The abutment 19 is preferably arranged to rotate the supporting arms 10 and frames 5 through an angle of approximately 90°.

The section of the run 2b adjacent to the gears 12,14 and the tilting means 18 has an inclined or horizontal orientation and constitutes an egg discharging section of the egg elevator 2. The eggs 3 are here gently discharged from the egg elevator 2. Similarly, the egg elevator 2 is designed in such a manner that transfer of the eggs 3 from the branch conveyors 1 to the egg elevator 2 occurs gently. Consequently, the proportion of cracked eggs is greatly reduced.

Figure 3:
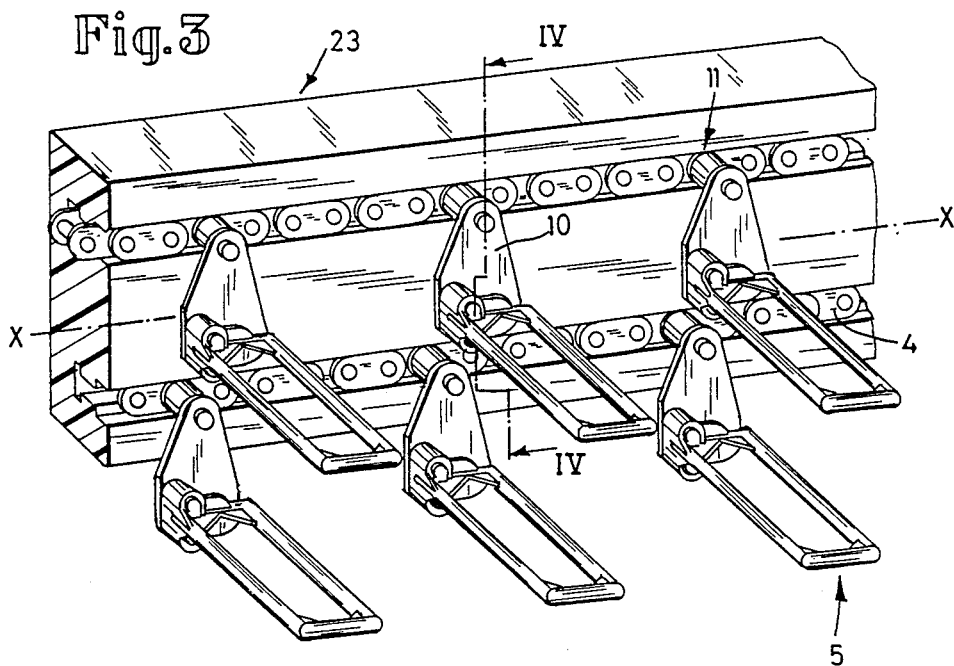
FIG. 3 is a fragmentary perspective view showing the egg elevator mounted in a guide which is constituted by a beam of synthetic plastic material.
Figure 4:
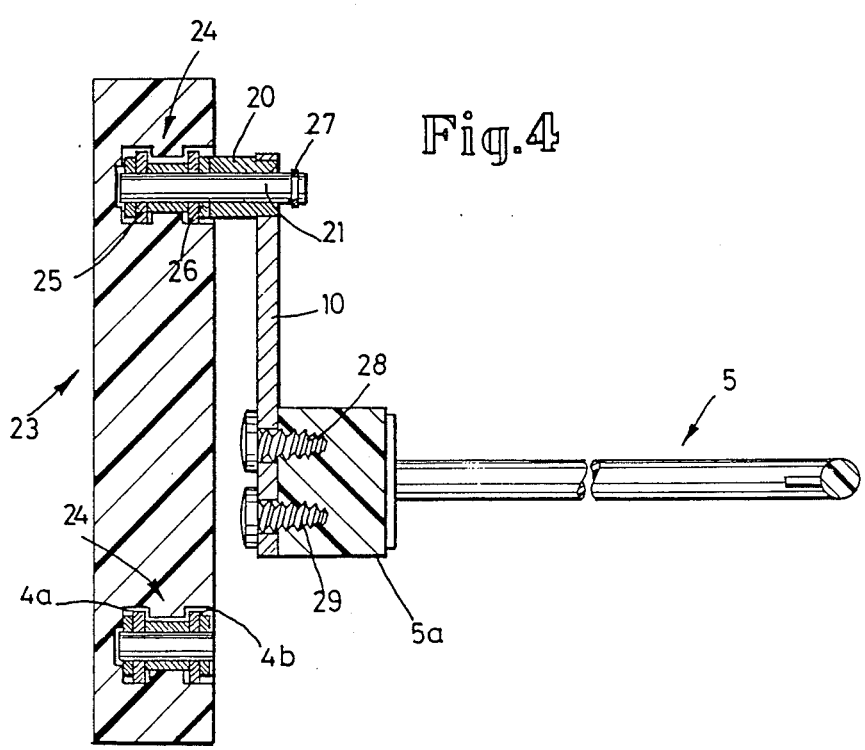
FIG. 4 is a sectional view as seen in the direction of the arrows IV—IV of FIG. 3.

In FIGS. 3 and 4, the chain 4 is mounted in a guide or support 23 consisting of a deformable material, preferably an antifriction synthetic plastic material. The guide 23, which may be in the form of a beam, is provided with an endless groove 24 which receives and guides the chain 4. The cross-sectional outline of the groove 24 is similar to that of the chain 4 as best seen in FIG. 4.

The chain 4 of FIGS. 3 and 4 is in the form of a band or roller chain having projections or projecting portions 4a and 4b. The groove 24 has corresponding cutouts or recessed portions 25 and 26 which respectively receive the projections 4a,4b of the chain 4. The groove 24 thus constitutes a holding device or means which functions to retain the chain 4 in the guide 23.

The chain 4 may be of a type other than a band or roller chain and, in such an event, the groove 24 may have a configuration different from that of FIGS. 3 and 4.

In FIGS. 3 and 4, the guide 23 is constituted by a single beam which receives both runs of the chain 4. However, if space considerations do not permit both runs of the chain 4 to be mounted in a single beam, the guide 23 may be divided into a plurality of beams. For example, the guide 23 may be divided into two beams which are spaced from one another and respectively carry one run of the chain 4. The two runs of the chain 4 are then spatially separated from one another.

FIG. 4 shows that each of the frames 5 may be formed with a block-like portion 5a at the end thereof adjacent to the respective supporting arm 10. The block-like portion 5a is rigidly secured to the associated supporting arm 10 by means of a pair of screws 28 and 29. It will be observed that each frame 5 is mounted at one end of the respective supporting arm 10.

A sleeve 20 is fixed to the opposite end of each supporting arm 10, and the sleeves 20 are preferably composed of a corrosion-resistant antifriction material. Each of the sleeves 20 rotatably receives a pivot pin 21 which is carried by and extends laterally of the chain 4. The pivot pins 21 advantageously also consist of a corrosion-resistant material. The sleeves 20 are held on the pivot pins 21 by means of respective clamping rings 27.

The guide 23 is elongated and has a central longitudinal axis X—X shown in FIG. 3. Since the guide 23 consists of a deformable material such as, for example, a synthetic resin, it is possible to bend the guide 23 about its longitudinal axis to form bends or curves. If the radius of curvature required in a particular situation is smaller than that which can be achieved with the cold bending characteristics of the guide 23, the guide 23 may be softened by heating and then bent.

Figure 5:
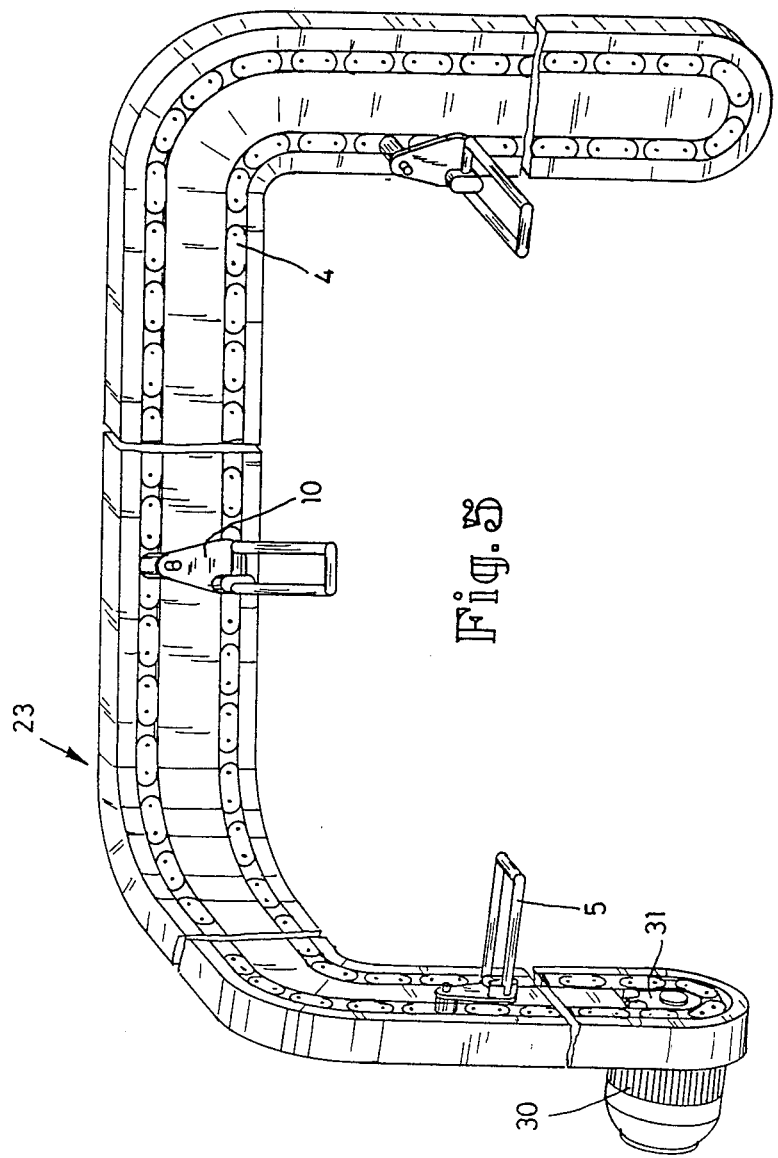
FIG. 5 is a fragmentary perspective view showing bends in the beam of FIG. 3.

FIG. 5 shows that the guide 23 may be bent in a variety of directions. It is readily seen from FIG. 5 that the arrangement according to the invention makes it possible to reach any desired region of a given area.

FIG. 5 further illustrates one embodiment of a drive means for the chain 4. The drive means includes a sprocket 31 which is in mesh with the chain 4, and a motor 30 arranged to rotate the sprocket 31.

Without further analysis, the foregoing will so fully reveal the gist of the present invention that others can, by applying current knowledge, readily adapt it for various applications which, from the standpoint of prior art, fairly constitute essential characteristics of the generic and specific aspects of the instant contribution to the art and, therefore, such adaptations should and are intended to be comprehended within the meaning and range of equivalence of the appended claims.

I claim:

1. An arrangement for removing eggs from laying houses disposed at different levels, comprising a first conveyor at each level, said first conveyors extending by the respective laying houses so as to collect eggs from the same, and each of said first conveyors having a discharge end; and a second conveyor for transporting eggs away from the respective levels, said second conveyor having an egg receiving section which extends by said discharge ends, and said second conveyor including an endless driven member defining an endless path, and a plurality of egg carriers mounted on said driven member for movement along said path and each including a frame like element for cradling eggs, each of said frame-like elements being substantially rectangular and including a pair of spaced, essentially parallel longitudinal frame components and a pair of spaced, essentially parallel transverse frame components connecting the respective longitudinal frame components to one another, and said second conveyor being designed so that said frame-like elements are substantially horizontal in said receiving section.

2. The arrangement of claim 1, wherein said frame-like elements are pivotally mounted on said driven member.

3. The arrangement of claim 1, wherein each of said carriers further comprises a supporting arm which is connected with said driven member and carries the respective frame-like element.

4. The arrangement of claim 3, wherein each of said arms is essentially perpendicular to the respective frame-like element.

5. The arrangement of claim 3, wherein said frame-like elements are rigid with the respective arms and said arms are pivotally mounted on said driven member.

6. The arrangement of claim 1, wherein said driven member comprises a chain.

7. The arrangement of claim 1, comprising drive means for said driven member; and wherein said drive means is designed to advance said driven member in a direction such that said carriers move downwards in said receiving section.

8. The arrangement of claim 1, said second conveyor having an egg discharging section, and said frame-like elements being pivotally mounted on said driven member; and further comprising tilting means at said discharging section arranged to cause tilting of said frame-like elements.

9. The arrangement of claim 8, wherein said tilting means is designed to cause tilting of said frame-like elements through an angle of approximately 90°.

10. The arrangement of claim 8, each of said carriers further comprising a supporting arm which is pivotally connected with said driven member and carries the respective frame-like element; and wherein said tilting means comprises an abutment projecting into the path of said arms.

11. The arrangement of claim 10, wherein said abutment comprises a slide plate.

12. The arrangement of claim 8, further comprising deflecting means for changing the direction of travel of said driven member, said tilting means being disposed in the region of said deflecting means.

13. The arrangement of claim 12, wherein said deflecting means comprises a system of rotary elements.

14. The arrangement of claim 1, wherein said frame-like elements consist at least in part of a synthetic resin.

15. The arrangement of claim 1, each of said discharge ends having a predetermined width; and wherein each of said frame-like elements has a predetermined length which approximates said predetermined width.

16. The arrangement of claim 1, further comprising a guide for said second conveyor, said guide being provided with at least one groove which receives said driven member.

17. The arrangement of claim 16, wherein said groove has a cross-sectional outline similar to the cross-sectional outline of said driven member.

18. The arrangement of claim 17, wherein said driven member has projecting portions and said groove has recessed portions which receive said projecting portions.

19. The arrangement of claim 16, wherein said guide is elongated and has at least one bend as considered in a longitudinal direction thereof.

20. The arrangement of claim 16, wherein said guide consists at least in part of a synthetic resin.

21. The arrangement of claim 1, said driven member including a plurality of pivot pins; and wherein each of said carriers further comprises a supporting arm which carries the respective frame-like element, and a sleeve mounted on the respective supporting arm and rotatably receiving one of said pivot pins.

22. The arrangement of claim 21, wherein each of said supporting arms comprises a heavy metal plate.

23. The arrangement of claim 21, wherein each of said sleeves consists at least in part of corrosion-resistant antifriction material.

24. The arrangement of claim 23, wherein each of said pivot pins consists at least in part of corrosion-resistant material.

25. An arrangement for removing eggs from laying houses disposed at different levels, comprising a first conveyor at each level, said first conveyors extending by the respective laying houses so as to collect eggs from the same and each of said first conveyors having a discharge end; and a second conveyor for transporting eggs away from the respective levels, said second conveyor having an egg receiving section which extends by said discharge ends, and said second conveyor including an endless driven member defining an endless path, and a plurality of egg carriers mounted on said driven member for movement along said path, each of said carriers comprising a supporting arm which is freely pivotable on said driven member and a frame-like element rigid with, and essentially perpendicular to, the respective arm, and each of said frame-like elements being substantially rectangular and including a pair of spaced, essentially parallel longitudinal frame components and a pair of spaced, essentially parallel transverse frame components connecting the respective longitudinal frame components to one another, said carriers being designed in such a manner that said frame-like elements are continuously urged towards horizontal positions.

26. The arrangement of claim 25, further comprising a guide for said second conveyor, said guide being provided with at least one groove which receives said driven member.

* * * * *